Patented Sept. 22, 1942

2,296,423

UNITED STATES PATENT OFFICE 2,296,423

PROCESS FOR RECOVERING IRON AND ALUMINUM COMPOUNDS

Louis F. Clark, Montebello, Calif.

No Drawing. Application December 7, 1938, Serial No. 244,375

7 Claims. (Cl. 23—117)

This invention relates to the recovery of useful iron (or iron and aluminum) compounds from the sulphate solutions obtained from leaching ores, concentrates or calcines, or from pickling operations, i. e., in treating ferrous metals with sulphuric acid to remove oxide scale, etc. In usual practice such solutions are used until their activity fails by reason of the fixation of free acid and because of the concentration of salts. Used pickle solutions are then usually discarded, and frequently become a waste nuisance. By the process herein described, valuable salts can be recovered from such solutions, some of the acid can be regenerated, and most of the liquid can be returned to the original operation.

The general principles upon which this application is based are disclosed in my two previous patents, viz., No. 1,503,229 of July 29, 1924, for "Process of treating solutions of metals," and No. 1,649,152 of November 15, 1927, for "Oxidizing metallic solutions." The present application covers the particular conditions found most suitable in using the general processes on waste solutions in which iron is the principal ingredient and from which a nearly complete removal of iron in one operation is sought. The processes described here are, moreover, analogous to those described in my co-pending application for "Processes for recovering aluminum compounds," filed October 20, 1937, Serial No. 170,029.

One of the particular objects of the present invention is to treat the large volumes of waste pickle liquor in such a way that valuable iron salts can be separated therefrom without resorting to evaporation or crystallization.

Another object is to regenerate a portion of the acid which has been consumed in any such leaching operation, and to prepare a solution of low iron content containing this regenerated acid which can be returned to the original operation.

A further object is to produce an iron salt comparatively rich in iron, combined with some acid, and which will readily combine with sufficient additional acid to make a normal salt.

Still another object is to combine an ore leaching and solution purification process into one operation in an autoclave at high temperature, as for example, in recovering manganese from low grade ores thereof.

The fundamental operation consists in treating solutions at high temperature and pressure in an autoclave so as to hydrolyse the normal sulphates of ferric iron (and aluminum) and precipitate basic salts, with simultaneous regeneration of free acid. The reaction ends at an equilibrium according to the concentration of salts originally present, to the temperature reached, and to the amount of alkali salt present. Ferrous iron is not so hydrolysed and precipitated, hence, can be separated from ferric iron. Pickle liquor, carrying mainly ferrous iron, must be oxidized either before or during the precipitation operation to accomplish iron recovery.

In the production of precipitated iron salt from waste pickle liquor, the solutions are to be heated in an autoclave, preferably by direct steam injection. It is desirable, therefore, that they be rich in iron. An autoclave feed carrying 60 to 70 grams per liter metallic iron is desirable. The solution should also be clarified, as by settling, so that no suspended insoluble matter will be carried into the autoclave. If a large proportion of free acid exists in the solution, it should be largely consumed by reaction on soluble iron compounds such as siderite, mill scale, or especially prepared limonite. If a relatively small amount of free acid is present, it will be taken care of in the regular operation of the process without special extra manipulation.

The iron in the solution may be nearly completely oxidized by the process described in my U. S. Patent No. 1,649,152, or by other suitable means. The process as shown in my patent may be summarized as follows:

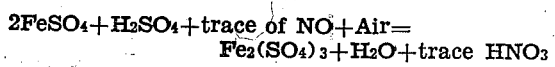

$2FeSO_4 + H_2SO_4 + $ trace of $NO + Air =$
$Fe_2(SO_4)_3 + H_2O + $ trace $HNO_3$ This operation consumes some free acid, if present. If no free acid is available, the solution will become turbid with basic salt, but this is not important because we eventually precipitate most of the iron as basic salt anyway. The oxidation by this operation should not be carried to completion; some ferrous iron should be left to be oxidized by the trace of nitrate when the solution is subsequently heated in the autoclave.

It should also be noted that the oxidation, wholly or in part, can be effected by the direct injection of oxygen into the solution while at high temperature and pressure. Under these conditions this reaction is comparatively active, even without the presence of any catalytic oxide of nitrogen, although a trace of such a catalyst may be used to advantage to save time. It is also useful to withdraw oxygen from the gas space above a solution and reinject it again below the surface of the liquid so as to get dispersion of gas into the liquid.

The hydrolysis effected at the higher temperatures may be represented as follows:

$$Fe_2(SO_4)_3 + 4H_2O = Fe_2(OH)_4(SO_4) + 2H_2SO_4$$

In this operation free acid is regenerated, and this, in conjunction with the solution condition and the temperature attained, determines the extent of the reaction, i. e., the proportion of the total iron which is precipitated as basic sulphate.

Assuming a solution in which nearly all the iron is ferric iron and which carries little if any free acid, there are yet other factors which can be adjusted so as to secure a precipitation of over 90% of the iron. These factors are the addition of an alkali salt, e. g., $Na_2SO_4$ (or even NaCl), and also the addition of soluble iron oxides, e. g., specially prepared limonite, to partly consume the free acid generated in the autoclave operation itself.

Where a good quality of precipitate is one of the objectives, the iron oxide used for this purpose should be low in insoluble material and finely pulverized, and made up into a slurry with water. This slurry should then, preferably, be injected into the autoclave after the solution therein has been brought to high temperature and pressure. Under these circumstances, the hydrolysis may be made nearly complete, as follows:

$$Na_2SO_4 + Fe_2(SO_4)_3 + 2Fe_2O_3 + 6H_2O = Na_2SO_4.3Fe_2(OH)_4.SO_4$$

The iron compound used here to fix the regenerated free acid can also be mixed into the solution before heating in the autoclave, but it has been found that by allowing the hydrolysis to proceed as far as it will first, in the solution itself, then injecting the extra iron as a slurry, that the final precipitate is much more granular and easily filtered. Limonite dehydrated at 600° F. and then finely pulverized (as with a grinding mill in circuit with an air separator) makes an effective oxide slurry for this purpose. A mechanical agitator in the autoclave is useful in helping to keep iron oxide in suspension until the reaction is complete.

A suitable iron compound for this purpose may also be prepared by precipation of a hydroxide sludge from the waste pickle liquor, or from washes obtained in leaching an ore, by soda ash. The precipitate is separated from the main mass of the liquid, and the slurry so formed directly injected into the autoclave, as described in my co-pending application Serial No. 170,029, for treatment of solutions of aluminum. Still other sources of iron oxide for this purpose are blast furnace flue dust, pyrites cinder, calcine from the copper or zinc sulphide concentrates, or manganese ores prepared for leaching by a reducing roast.

If now we combine all the preceding reactions into one operation on the original $FeSO_4$ by injecting oxygen as well as an acid soluble ferric oxide into the autoclave, (as well as having the proper amount of alkali ion, and trace of nitric oxide present), we can write the equation:

$$6FeSO_4 + 2Na_2SO_4 + 3O + 12H_2O + 3Fe_2O_3 = 2(NaSO_4.3Fe_2(OH)_4(SO_4))$$

According to the above, 1.43 pounds soluble $Fe_2O_3 + 0.143$ pound oxygen $+ 0.85$ pound $Na_2SO_4$ for each one-pound Fe as $FeSO_4$ would tend to bring about complete precipitation of iron in 5.77 pounds of precipitate. In practice, however, it it not necessary to supply $Fe_2O_3$ for all the free acid regenerated by hydrolysis in the autoclave, since in the presence of alkali ion and at the higher temperature in the autoclave, the basic precipitate is formed in the presence of considerable free acid. Thus we can get over 90% precipitation of the iron originally present as $FeSO_4$ by using a smaller quantity of both $Na_2SO_4$ and $Fe_2O_3$ than indicated above, and at the same time let the free acid in the mother liquor build up to 3-5% $H_2SO_4$. Thus the autoclave tail solution, after removal of precipitate, can be returned to the pickle operation and such free acid becomes available for useful work.

It will be noted, as above indicated, that the autoclave precipitate formed under these conditions is not simply a basic ferric sulphate, but is a double basic salt of alkali and iron and is analogous to the natural mineral natrojarosite, $Na_2SO_4.3Fe_2(OH)_4.SO_4$, although the actual precipitate formed in the autoclave may vary considerably from this type mineral formula, particularly in the ratio of alkali to iron.

This insoluble precipitate can be readily filtered out of the mixture discharged from the autoclave and it can also be well washed on the filter. It has been found that such a double basic salt can be made soluble in dilute acids by calcination under closely controlled furnace conditions, so that most of the water combined as hydroxyl group will be expelled, and yet prevent the loss of much $SO_2$ or $SO_3$. This conversion into the acid soluble form by calcination is very much more readily accomplished on this double basic salt than on basic ferric sulphate only, which apparently begins to decompose (i. e., evolve $SO_2$ and $SO_3$) before it is completely dehydrated, thus merging from one insoluble form into another with less of the useful "intermediate" product, which is soluble in dilute acid, being obtained.

As an example of the operation of this process in pickling steel, let the operation be conducted so as to discard a waste liquor at 1.17 sp. gr., carrying 15% $FeSO_4$ (5.5% Fe), and 1.70% free $H_2SO_4$. Every ton of such liquor would call for the addition of about 15 pounds oxygen, 150 pounds soluble ferric oxide and 75 pounds $Na_2SO_4$, and enough steam to raise the temperature to 350° F. This treatment would produce about 500 pounds precipitate and a solution carrying about 3% $H_2SO_4$. Such a mixture as discharged from the autoclave is to be passed through a settling tank and the clarified solution returned to the pickling operation.

As further examples of the application of this process, consider the simultaneous leaching of copper or zinc sulphide concentrates and the precipitation of insoluble basic iron compound in an autoclave at high temperature. Here the pulverized ore is suspended in a dilute solution of acid and iron sulphate, heated to about 350° F. and oxidized by injection of oxygen. (The presence of alkali ion and trace of nitrogen oxide is assumed but omitted for simplicity in the following equations.)

$$FeSO_4 + CuFeS_2 + 9O + 3H_2O = CuSO_4 + Fe_2(OH)_4SO_4 + H_2SO_4$$

Or, leaching a mixture of pulverized sulphide mineral and oxidized ferruginous manganese ore in the autoclave at high temperature.

$$2FeS_2 + 7Fe_2O_3.MnO_2 + 19H_2SO_4 = 16FeSO_4 + 7MnSO_4 + 19H_2O$$

Or, leaching the oxidized manganese ore in the autoclave at high temperature with injection of sulphur dioxide.

$$Fe_2O_3 \cdot MnO_2 + H_2SO_4 + 2SO_2 = 2FeSO_4 + MnSO_4 + H_2O$$

And, if desired, in any of these cases, oxidizing the iron to effect precipitation and removal of the greater part of the iron, by addition of extra oxidized manganese ore itself. This addition may well be made after the primary leaching step by injection of a slurry of the manganese ore as before described.

$$2FeSO_4 + MnO_2 + 2H_2O = Fe_2(OH)_4SO_4 + MnSO_4$$

It should also be noted that a sulphide concentrate may be partly or completely oxidized by roasting in a furnace before being subjected to the reaction in the autoclave, and also that the iron oxide used in the slurry for injection may itself be part of a double sulphide which has been calcined to make an acid soluble oxide.

Attention should also be drawn to the fact that solutions of aluminum can also be treated by the methods herein described, whereby with suitable additions of soluble iron oxide and alkali, followed by heating in the autoclave to about 350° F., both the iron and aluminum can be nearly completely precipitated as a complex basic iron aluminum alkali sulphate. Conversely, solutions of iron may be treated with additions of soluble alumina to produce the same result.

Having thus described the general character of my processes for the treatment of sulphate solutions of iron, and given examples of its practice, it will be evident to those familiar with this art that various modifications may be made or special applications devised without departing from the process as defined in the following claims.

I make, therefore, the following claims:

1. The method of treating sulphate solutions of assorted metals including iron and aluminum sulphate to selectively precipitate a double basic sulphate of trivalent metals of the group consisting of aluminum and ferric iron, and alkali metal, which consists in adjusting the proportion of alkali metal so that the solution contains approximately one mol of alkali metal sulphate for each mol of said trivalent metal sulphate in the solution, adding approximately two mols of the oxide of said trivalent metal for each mol of said trivalent metal sulphate in the solution, and heating the mixture in an autoclave at a temperature above 300° F.

2. The method of treating sulphate solutions of assorted metals including iron and aluminum sulphate to selectively precipitate a double basic sulphate of trivalent metals of the group consisting of aluminum and ferric iron, and alkali metal, which consists in adjusting the proportion of alkali metal so that the solution contains approximately one mol of alkali metal sulphate for each mol of said trivalent metal sulphate in the solution, adding approximately two mols ferric oxide for each mol of said trivalent metal sulphate in the solution, and heating the mixture in an autoclave at a temperature above 300° F.

3. The method of treating sulphate solutions of assorted metals including ferrous sulphate and aluminum sulphate to selectively precipitate a double basic sulphate of trivalent metals of the group consisting of aluminum and ferric iron, and alkali metal, which consists in adjusting the proportions of alkali metal so that the solution contains approximately two mols alkali metal sulphate for each six mols ferrous sulphate in the solution, adding approximately three mols ferric oxide for each six mols ferrous sulphate in the solution, heating the mixture in an autoclave at a temperature above 300° F., and oxidizing all iron to the ferric state.

4. The method of treating sulphate solutions of assorted metals including ferric sulphate to selectively precipitate a double basic sulphate of ferric iron and alkali metal similar to the jarosite minerals which consists in adjusting the proportions of alkali metal so that the solution contains approximately one mol alkali metal sulphate for each mol ferric sulphate in the solution, adding approximately two mols ferric oxide for each mol ferric sulphate in the solution, and heating the mixture in an autoclave at a temperature above 300° F.

5. The method of treating sulphate solutions of assorted metals including ferrous sulphate to selectively precipitate a double basic sulphate of ferric iron and alkali metal similar to the jarosite minerals which consists in adjusting the proportions of alkali metal so that the solution contains approximately two mols alkali metal sulphate for each six mols ferrous sulphate in the solution, adding approximately three mols ferric oxide for each six mols ferrous sulphate in the solution, heating the mixture in an autoclave at a temperature above 300° F., and oxidizing all iron to the ferric state.

6. The method of treating sulphate solutions of iron including ferrous sulphate to precipitate a double basic sulphate of ferric iron and alkali metal similar to the jarosite minerals which consists in adding approximately three mols of ferric oxide and two mols of alkali metal sulphate for each six mols of ferrous sulphate in the solution, oxidizing the dissolved iron and heating the mixture in an autoclave to a temperature above 300° F.

7. The method of treating sulphate solutions of iron including ferric sulphate to precipitate a double basic sulphate of ferric iron and alkali metal similar to the jarosite minerals which consists in adding approximately two mols ferric oxide and one mol alkali metal sulphate for each mol of ferric sulphate in solution and heating the mixture in an autoclave at a temperature above 300° F.

LOUIS F. CLARK.